(12) United States Patent
Yoon et al.

(10) Patent No.: US 8,779,083 B2
(45) Date of Patent: Jul. 15, 2014

(54) POLYLACTIDE RESIN, METHOD OF PREPARING THE SAME, AND POLYLACTIDE RESIN COMPOSITION COMPRISING THE SAME

(75) Inventors: Sung-Cheol Yoon, Daejeon (KR); Seung-Young Park, Daejeon (KR); Do-Yong Shim, Bucheon-si (KR); In-Su Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 236 days.

(21) Appl. No.: 13/515,746

(22) PCT Filed: Sep. 2, 2010

(86) PCT No.: PCT/KR2010/005417
§ 371 (c)(1),
(2), (4) Date: Jul. 31, 2012

(87) PCT Pub. No.: WO2011/074760
PCT Pub. Date: Jun. 23, 2011

(65) Prior Publication Data
US 2012/0289675 A1 Nov. 15, 2012

(30) Foreign Application Priority Data
Dec. 18, 2009 (KR) .................. 10-2009-0127204

(51) Int. Cl.
*C08G 63/85* (2006.01)
(52) U.S. Cl.
USPC ....................................................... 528/283
(58) Field of Classification Search
CPC ................................ C08G 63/08; G08L 67/04
See application file for complete search history.

(56) References Cited

U.S. PATENT DOCUMENTS 7,445,841 B1 * 11/2008 Kaijiyama et al. ............ 428/364
2009/0035571 A1 2/2009 Kaijiyama et al.

FOREIGN PATENT DOCUMENTS

| CN | 102333785 A | 1/2012 |
| JP | 04-216822 A | 8/1992 |
| JP | 08-034837 A | 2/1996 |
| JP | 10-139868 A | 5/1998 |
| JP | 2002-180328 A | 6/2002 |
| JP | 2003-221499 A | 8/2003 |
| JP | 2004-332166 A | 11/2004 |
| JP | 2007191550 A | 8/2007 |
| KR | 10-0519015 B1 | 10/2005 |
| WO | 00/78839 A1 | 12/2000 |
| WO | WO 2007-091427 A1 | 8/2007 |

OTHER PUBLICATIONS

Lixin Yang et al.; "Stabilization of Poly(Lactic Acid) by Polycarbodiimide"; In: Polymer Degradation and Stability, Jul. 2008, vol. 93, pp. 1923-1929.

* cited by examiner

*Primary Examiner* — Doris Lee
(74) *Attorney, Agent, or Firm* — McKenna Long & Aldridge, LLP

(57) ABSTRACT

Disclosed are polylactide resin that may exhibit and maintain excellent mechanical properties, exhibit excellent heat resistance, and thus can be used for a semi-permanent use, a method for preparing the same, and a polylactide resin composition comprising the same.

The polylactide resin has a low hydrolysis rate constant of 0.1 $day^{-1}$ or less and a weight average molecular weight of 100,000~1,000,000, under specific conditions.

15 Claims, 3 Drawing Sheets

POLYLACTIDE RESIN, METHOD OF PREPARING THE SAME, AND POLYLACTIDE RESIN COMPOSITION COMPRISING THE SAME

This application is a National Stage Entry of International Application No. PCT/KR2010/005417, filed Sep. 2, 2010, and claims the benefit of Korean Application No. 10-2009-0127204, filed on Dec. 18, 2009, which is hereby incorporated by reference in its entirety for all purposes as if fully set forth herein.

BACKGROUND OF THE INVENTION (a) Field of the Invention

This disclosure relates to polylactide resin, a method of preparing the same, and a polylactide resin composition comprising the same. More particularly, this disclosure relates to polylactide resin that may exhibit and maintain excellent mechanical properties, exhibit excellent heat resistance, and thus can be used for a semi-permanent use, a method for preparing the same, and a polylactide resin composition comprising the same.

(b) Description of the Related Art

A polylactide (or polylactic acid) resin is a kind of resin comprising a repeat unit of the following General Formula. Since the polylactide resin is based on biomass unlike existing crude oil-based resin, it may utilize renewable resource, less discharge global warming gas of $CO_2$ compared to existing resin when prepared, and has appropriate mechanical strength equivalent to the existing crude oil-based resin together with eco-friendly property such as being biodegradable by water and microorganisms, and the like when embedded.

[General Formula]

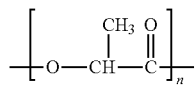

The polylactide resin has been mainly used for a disposable packaging, coating, foam, a film/sheet and fiber, and recently, there is a growing effort to mix the polylactide resin with existing resin such as ABS, polycarbonate or polypropylene, and the like to compensate the properties, and then, apply it for a semi-permanent use such as exterior furnishing of a mobile phone or interior furnishing of automobiles, and the like. However, since the polylactide resin is difficult to manifest and maintain excellent mechanical properties due to decomposition or depolymerization, and the like during use, the application range is limited as yet.

Meanwhile, as a method of preparing existing polylactide resin, a method of direct condensation polymerization of lactic acid, or ring opening polymerization of lactide monomers in the presence of an organic metal catalyst is known. Since the direct condensation polymerization, although it may prepare inexpensive polymer, is difficult to obtain polymer of high molecular weight having weight average molecular weight of 100,000 or more, it is difficult to secure sufficient physical and mechanical properties of polylactide resin. Although ring opening polymerization of lactide monomers requires higher unit cost compared to condensation polymerization because it should prepare lactide monomers from lactic acid, it may obtain resin having relatively high molecular weight and is advantageous in terms of polymerization control, and thus, it is commercially applied.

Representative catalysts used in the ring opening polymerization may comprise an Sn containing catalyst such as $Sn(Oct)_2$ (Oct=2-ethyl hexanoate). However, it has been reported that this catalyst tends to facilitate depolymerization under conversion rate beyond a certain level, as well as facilitate ring opening polymerization (U.S. Pat. No. 5,142,023; Leenslag et al. *Makromol. Chem.* 1987, 188, 1809-1814; Witzke et al. *Macromolecules* 1997, 30, 7075-7085). On this account, polylactide resin prepared by the ring opening polymerization is also difficult to have sufficiently high molecular weight, and it has insufficient physical, mechanical properties because thermal decomposition or hydrolysis, and the like occur due to depolymerization during use.

Thus, even if previously known ring opening polymerization is applied, it is difficult to provide polylactide resin having sufficiently high molecular weight and excellent mechanical property, and decomposition or depolymerization of resin occurs during use of the polylactide resin thus largely deteriorating mechanical property. Therefore, there is a limit in an effort to apply eco-friendly polylactide resin for a semi-permanent use such as exterior furnishing of a mobile phone or interior furnishing of automobiles.

SUMMARY OF THE INVENTION

The present invention provides polylactide resin that may exhibit and maintain excellent mechanical properties, exhibit excellent heat resistance and hydrolysis resistance, and thus, can be used for a semi-permanent use.

The present invention also provides a method for preparing polylactide resin, which enables preparation of the polylactide resin with high conversion rate.

The present invention also provides a polylactide resin composition comprising the polylactide resin.

The present invention provides polylactide resin having a weight average molecular weight of about 100,000~1,000,000, having a hydrolysis rate constant (k) of about 0.1 day$^{-1}$ or less, as calculated by the following Mathematical Formula 1 at 60° C. and relative humidity of 90%, and containing residual metal of tin or zinc derived from a catalyst in the content of about 20 ppm or less, based on the weight of the polylactide resin:

$$\text{Log}_e [Mn,t/Mn,0] = -kt \quad \text{[Mathematical Formula 1]}$$

In the Mathematical Formula 1, Mn,0 represents an initial number average molecular weight of the polylactide resin, and Mn,t represents a number average molecular weight of the polylactide resin when maintained at a temperature of 60° C. and relative humidity of 90%, for a time t (day).

The present invention also provides a method of preparing the polylactide resin, comprising conducting ring opening polymerization of lactide monomers in the presence of an organic metal complex of the following Chemical Formula 1, wherein the organic metal complex is added in the ratio of about 0.0005 to about 0.1 moles, based on 100 moles of the lactide monomers:

[Chemical Formula 1]

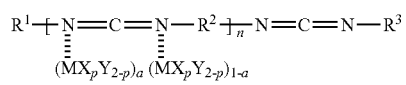

in the Chemical Formula 1, n is an integer of from 0 to 15, p is an integer of from 0 to 2, a is 0 or 1, M is Sn or Zn, $R^1$ and $R^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, $R^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

The present invention also provides a method for preparing the polylactide resin, comprising conducting ring opening polymerization of lactide monomers in the presence of compounds of the following Chemical Formulae 2 and 3, wherein the compounds of the Chemical Formulae 2 and are respectively added in the ratio of about 0.0005 to about 0.1 moles, based on 100 moles of the lactide monomers.

[Chemical Formula 2]

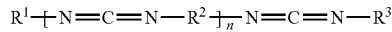

[Chemical Formula 3]

in the Chemical Formulae 2 and 3, n is an integer of from 0 to 15, p is an integer of from 0 to 2, a is 0 or 1, M is Sn or Zn, $R^1$ and $R^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, $R^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

The present invention also provides a polylactide resin composition comprising the polylactide resin.

DETAILED DESCRIPTION OF THE EMBODIMENTS

Figure 1:
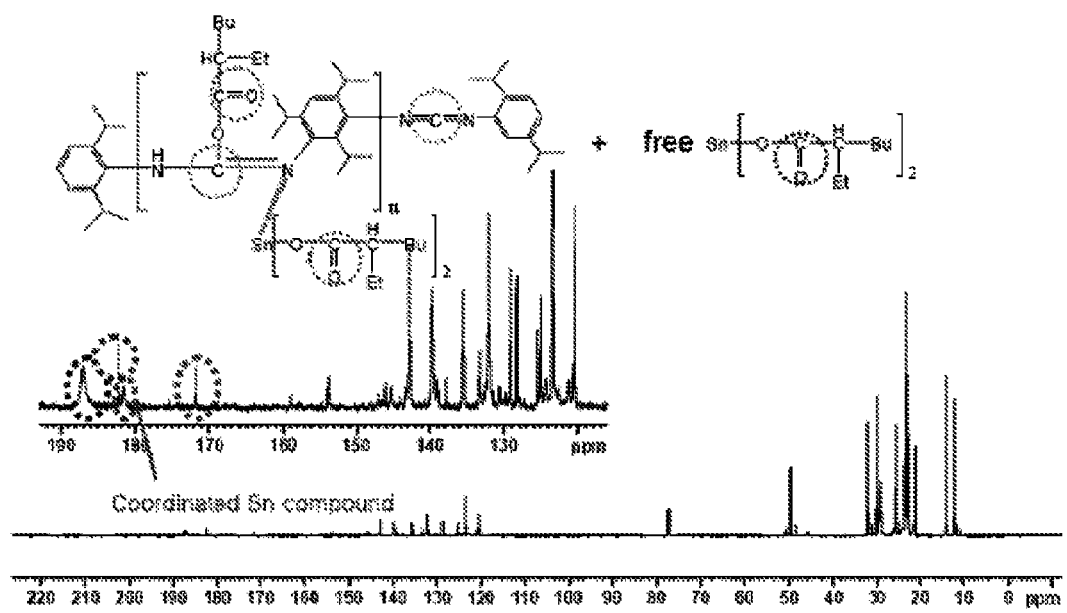
FIG. 1 is a $^{13}C$ NMR spectrum of an organic metal complex.

Hereinafter, polylactide resin, a method for preparing the same, and a polylactide resin composition comprising the same according to specific embodiments of the invention will be explained.

Unless otherwise described, terms used throughout the specification are defined as follows.

As used herein, the term "comprising" or "containing" refers to comprising a constitutional element (or constitutional ingredient) without specific limitation, and it should not be interpreted that other constitutional elements (or constitutional ingredients) are excluded.

The term "lactide monomer" may be defined as follow. Lactide is commonly divided into L-lactide consisting of L-lactic acid, D-lactide consisting of D-lactide, and meso-lactide consisting of L-form and D-form. And, D,L-lactide or rac-lactide refers to those wherein L-lactide and D-lactide are mixed at a ratio of 50:50. Among these lactides, it is known that L- or D-polylactide (PLLA or PDLA) having very high stereoregularity is obtained if polymerization is progressed using only L-lactide or D-lactide having high optical purity, and it is also known that the polylactide has rapid crystallization speed and high crystallinity compared to polylactide having low optical purity. However, the term "lactide monomer" as used herein is defined as comprising all forms of lactides, irrespectively of property difference of lactides according to each form and property difference of polylactides formed therefrom.

And, the term "polylactide resin" is defined to include homopolymer or copolymer comprising a repeat unit of the following general Formula. The "polylactide resin" may be prepared by a process comprising forming the following repeat unit by ring opening polymerization, and the polymer after the ring opening polymerization and a process of forming the following repeat unit are completed may be referred to as the "polylactide resin". The "lactide monomer" includes all forms of lactides as explained above.

[General Formula]

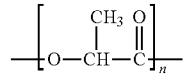

In the category of the polymer that may be referred to as the "polylactide resin", polymer of any state after the ring opening polymerization and the process of forming the repeat unit are completed, for example, non-purified or purified polymer after the ring opening polymerization is completed, polymer included in a liquid or solid resin composition before forming a product, or polymer included in plastic or woven fabrics, and the like after forming a product, and the like may be included. Therefore, all the properties of the "polylactide resin" as used herein may be defined as properties of polymer of any state after the ring opening polymerization and the process of forming the repeat unit are completed.

And, the term "polylactide resin composition" refers to any composition comprising the "polylactide resin" or prepared therefrom, before or after forming a product. In the category of the composition that may be referred to as the "polylactide resin composition", plastic or woven fabrics, and the like after forming a product, as well as a composition of a liquid or solid state in the form of a master batch or a pellet, and the like before forming a product may be included.

Meanwhile, the inventors found out that polylactide resin that has a high molecular weight compared to previously known polylactide resin, and satisfies specific hydrolysis rate constant range measured under specific conditions and specific content range of residual metal of tin or zinc derived from a catalyst during polymerization, may be prepared through the following preparation method using a specific catalyst, and completed the invention.

According to one embodiment, the polylactide resin has a weight average molecular weight of about 100,000~1,000,000, has a hydrolysis rate constant (k) of about 0.1 day$^{-1}$ or less as calculated by the following Mathematical Formula 1 at 60° C. and relative humidity of 90%, and contains residual metal of tin or zinc derived from a catalyst in the content of about 20 ppm or less, based on the weight of the polylactide resin:

$$Log_e [Mn,t/Mn,0]=-kt$$ [Mathematical Formula 1]

In the Mathematical Formula 1, Mn,0 represents an initial number average molecular weight of the polylactide resin, and Mn,t represents a number average molecular weight of the polylactide resin when maintained at a temperature of 60° C. and relative humidity of 90%, for a time t (day).

The polylactide resin has a high molecular weight compared to previously known polylactide resin. And, the polylactide resin satisfies a specific hydrolysis rate constant range and a specific content range of residual metal of tin or zinc derived from a catalyst, which are low levels that could not be satisfied by any existing polylactide resin. As will be explained in detail, since polylactide resin is prepared using a specific catalyst having excellent polymerization activity and removal performance of decomposition or depolymerization factors, polylactide resin according to one embodiment may be prepared, which exhibits a low hydrolysis rate constant and low residual metal content (i.e., low residual catalyst amount) that could not be satisfied by any existing polylactide resin, while having a high molecular weight compared to existing polylactide resin.

Since the polylactide resin has a high molecular weight compared to existing polylactide resin, more specifically a weight average molecular weight of maximum about 1,000,000, it may exhibit excellent physical, mechanical properties such as excellent tensile strength, and the like, compared to existing polylactide resin. More specifically, the polylactide resin has a high weight average molecular weight of about 100,000~1,000,000, preferably about 150,000~1,000,000, more preferably about 150,000~800,000, and thus it may exhibit excellent physical mechanical properties.

And, the polylactide resin may be provided with a high molecular weight even with a small amount of a catalyst due to excellent polymerization activity of the specific catalyst. Therefore, the content of metal remaining in the resin after polymerization, i.e., the content of residual metal may be minimized. Specifically, the polylactide resin may comprise residual metal of tin or zinc derived from a catalyst used in a polymerization in a very low content of about 20 ppm or less, preferably about 15 ppm or less, more preferably about 3~10 ppm.

As the result of experiment, it was found that the polylactide resin comprising low residual metal content, namely, low residual catalyst content may minimize depolymerization or decomposition during use, thus minimizing deterioration of mechanical properties, and maintaining excellent physical mechanical properties such as tensile strength, and thus, semi-permanent use of the polylactide resin may be enabled.

To the contrary, if the residual metal content exceeds about 20 ppm, depolymerization or decomposition may largely occur during use to cause large deterioration of mechanical properties, and thus, it may be difficult to semi-permanently use the polylactide resin similarly to the existing polylactide resin.

The reason why the degree of decomposition and the degree of deterioration of mechanical properties of the polylactide resin are influenced by the residual metal content derived from the catalyst (i.e., residual catalyst content) may be expected as follow.

During the process of preparing polylactide resin, a catalyst containing tin or zinc, and the like is used for ring opening polymerization, some of which inevitably remains in finally prepared resin. The residual catalyst may be bonded to the end of the polylactide resin, and the combined body may induce hydrolysis with water or carboxylic acid or trans-esterification, and the like to cause decomposition of the polylactide resin or decrease in the molecular weight.

Further, a reaction mediated by the catalyst involves thermodynamic equilibrium between monomer-polymer. Thus, if a small amount of lactide monomers and catalyst remain in the polylactide resin, a reaction between the residual lactide monomers and the polylactide resin may be mediated by the residual catalyst, which may cause depolymerization of the polylactide resin or decrease in the molecular weight, and the like by thermodynamic equilibrium.

Due to the decomposition or depolymerization of the polylactide resin, molecular weight and mechanical properties of the resin may be largely deteriorated, which renders semi-permanent use of the polylactide resin very difficult.

However, the polylactide resin according to one embodiment of the invention may be provided with a high molecular weight even with a small amount of catalyst, due to using of a specific catalyst having excellent polymerization activity. Therefore, the polylactide resin may have lower residual catalyst content than any existing resin, and thus the content of residual metal derived from the catalyst may be lower than any existing polylactide resin. Therefore, decomposition or depolymerization of resin, or deterioration of mechanical properties of resin due to the residual catalyst may be largely reduced.

Meanwhile, the polylactide resin according to one embodiment may satisfy a hydrolysis rate constant k of about 0.1 day$^{-1}$ or less as measured under severe conditions of high temperature and high humidity, and preferably the k may be about 0.07 day$^{-1}$ or less, more preferably about 0.01 to 0.05 day$^{-1}$.

The hydrolysis rate constant k is a characteristic value showing the degree of decrease in a number average molecular weight of polylactide resin over time under specific conditions. Polylactide resin commonly causes hydrolysis by moisture, which may be facilitated by acid or base. And, trans esterification may be facilitated by the presence of carboxylic acid or lewis acid (for example, a tin containing catalyst, and the like). Considering the reaction (decomposition) factors of the polylactide resin, the meaning of k may be represented by the hydrolysis rate formula of the following Mathematical Formula 2 (Tsuji et al., Journal of Applied Polymer Science, Vol. 77, 1452-1464 (2000)):

$$d[COOH]/dt=k[COOH][H_2O][ESTER] \text{ (}k\text{ is a hydrolysis rate constant)}$$ [Mathematical Formula 2]

And, the hydrolysis rate constant k may be obtained by measuring a number average molecular weight of the resin over time (day) and conducting linear regression by substituting in the Mathematical Formula 1, while exposing the polylactide resin at a temperature of 60° C. and relative humidity of 90%. Namely, the hydrolysis rate constant k may be obtained from the slope of the graph derived as the result of the linear regression (for example, see FIG. 3).

As will be supported by the following Examples, it was found that polylactide resin satisfying the above explained hydrolysis rate constant range may be obtained by progressing polymerization using a specific catalyst having removal performance of decomposition or depolymerization factors. The polylactide resin satisfies lower hydrolysis rate constant than any existing resin.

Further, as the result of experiments, it was found that the polylactide resin satisfying the above hydrolysis rate constant range may be used semi-permanently without deterioration of mechanical properties such as tensile strength, and the like even under sever conditions. To the contrary, it was confirmed that besides the above hydrolysis rate constant range, the molecular weight largely decreases and mechanical properties of polylactide resin are remarkably deteriorated, and thus it may be difficult to semi-permanently use the polylactide resin similarly to the existing resin.

Therefore, the polylactide resin satisfying the above explained molecular weight range and each characteristic value range may manifest excellent physical mechanical properties, and maintain excellent physical mechanical properties during use, and thus can be semi-permanently used as exterior furnishing of a mobile phone or interior furnishing of automobiles, and the like.

Meanwhile, the polylactide resin satisfying the above explained properties may be obtained using a specific catalyst having excellent polymerization activity and excellent removal performance of decomposition factors, and the like, which may be an organic metal complex of the following Chemical Formula 1, or a catalyst composition comprising compounds of the following Chemical Formulae 2 and 3:

[Chemical Formula 1]

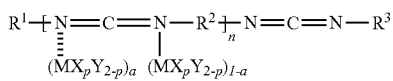

[Chemical Formula 2]

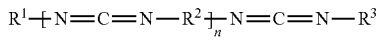

[Chemical Formula 3]

wherein, n is an integer of from 0 to 15, p is an integer of from 0 to 2, a is 0 or 1, M is Sn or Zn, $R^1$ and $R^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, $R^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

Therefore, metals of tin or zinc remaining in the polylactide resin may be included in the catalyst and remained. For example, the residual metal may be included in the form of the organic metal complex of the Chemical Formula 1, or it may be included in the form of the mixture of the compounds of the Chemical Formulae 2 and 3. The catalyst may be remained in a very small content in the polylactide resin as explained above, and thus, decrease in molecular weight or deterioration of mechanical properties, and the like may be prevented during use of the polylactide resin to enable semi-permanent use of the polylactide resin.

And, a carbodiimide moiety (moiety corresponding to the Chemical Formula 2) included in the catalyst of the Chemical Formula 1 or Chemical Formulae 2 and 3 may combine with water or acid, and the like to remove them. The water or acid, and the like is one of representative decomposition factors facilitating decomposition of polylactide resin through trans esterification or hydrolysis, and the like. Thus, decomposition, depolymerization or molecular weight decrease, and the like may be further inhibited by the action of the residual catalyst. Therefore, the polylactide resin according to one embodiment may manifest and maintain more excellent mechanical properties, and thus, can be semi-permanently used.

The polylactide resin according to one embodiment may comprise residual lactide monomers in the content of about 1.0 wt % or less, based on total weight of the polylactide resin and residual lactide monomers included therein, preferably in the content of about 0.7 wt % or less, more preferably about 0.1 to 0.5 wt %.

The residual content of the lactide monomers may be measured by analyzing the polylactide resin with an NMR instrument having high separation performance and calculating the ratio of integral values of CH peaks respectively derived from monomers and resin in the NMR spectrum.

The ring opening polymerization of lactide monomers is a reaction involving thermodynamic equilibrium of the monomers and the polylactide resin produced therefrom. Specifically, although a preparation reaction of polylactide resin by polymerization of lactide monomers predominantly occurs at the beginning of the polymerization, depolymerization of the polylactide resin occurs together after polymerization occurs to a specific degree. Therefore, in the polylactide resin prepared by ring opening polymerization, lactide monomers remain to some degree. However, the residual lactide monomers may facilitate depolymerization or decomposition of the polylactide resin during use, by the residual catalyst in the polylactide resin. Moreover, carboxylic acid may be formed by the decomposition of polylactide resin, and the carboxylic acid may further facilitate decomposition of polylactide resin. That causes large decrease in molecular weight of polylactide resin during use, which may deteriorate mechanical properties of the resin.

However, since the polylactide resin according to one embodiment is prepared using a specific catalyst having excellent polymerization activity, it may have high molecular weight within a short time. Thus, depolymerization which is an equilibrium reaction during polymerization may hardly occur, and only a very small amount of lactide monomers may remain in the polylactide resin. That may further reduce molecular weight decrease of the polylactide resin during use and resultant deterioration of mechanical properties.

Meanwhile, the polylactide resin according to one embodiment may have an acidity of about 20 meq/kg or less, preferably about 15 meq/kg or less, more preferably about 3 to 15 meq/kg.

This is because the specific catalyst for preparing the polylactide resin comprises a carbodiimide moiety, which combines with water or acid, and the like to remove them. Thus, the polylactide resin may exhibit lower acidity than existing resin.

As explained above, the water or acid, and the like may cause trans-esterification, and the like of polylactide resin by residual catalyst, which may become a major factor causing molecular weight decrease and deterioration of mechanical properties of polylactide resin. However, since the polylactide resin according to one embodiment exhibits the above explained low acidity range, decomposition, depolymerization or molecular weight decrease, and the like may be inhibited during use, and thus, deterioration of mechanical properties may be largely reduced to enable semi-permanent use.

Further, the polylactide resin according to one embodiment may exhibit weight decrease of less than about 20 wt %, specifically less than about 10 wt %, more specifically less than about 5 wt %, when raising temperature from room temperature to 300° C. according to thermogravimetric analysis (TGA).

Meanwhile, according to another embodiment, a method for preparing the polylactide resin is provided. According to one example of the invention, the preparation method may comprise conducting ring opening polymerization of lactide monomers in the presence of the organic metal complex of the Chemical Formula 1, wherein the organic metal complex may be added in the ratio of about 0.0005 to 0.1 moles per 100 moles of lactide monomers.

And, according to another example of the invention, the preparation method may comprise conducting ring opening polymerization of lactide monomers in the presence of compounds of the Chemical Formulae 2 and 3, wherein the compounds of the Chemical Formulae 2 and 3 may be respectively added in the ratio of about 0.0005 to 0.1 moles per 100 moles of lactide monomers.

According to the preparation method, the lactide monomers are subjected to ring opening polymerization to prepare polylactide resin, in the presence of the organic metal complex of the Chemical Formula 1 wherein a carbodiimide moiety is bonded to a metal catalyst, or a catalyst composition comprising the carbodiimide based compound of the Chemical Formula 2 and the metal catalyst of the Chemical Formula 3.

As will be supported by the following Examples, since the specific catalyst, namely the organic metal complex or the catalyst composition exhibits excellent polymerization activity, polylactide resin having a high molecular weight may be obtained even with a very small amount of the catalyst in the ratio of about 0.0005 to 0.1 moles per 100 moles of lactide monomers.

Accordingly, by the preparation method according to one example or another example of the invention, polylactide resin satisfying the molecular weight range and residual catalyst amount range according to one embodiment of the invention may be prepared.

Meanwhile, it is known that in the ring opening polymerization of the lactide monomers, the catalyst reacts with a hydroxyl group containing initiator or water, and the like to form a metal hydroxyl or alkoxide compound, which is used as substantial catalyst active species. Specifically, the metal hydroxyl or alkoxide compound facilitates the ring opening polymerization to prepare polylactide resin, and during the process of forming the metal hydroxyl or alkoxide compound, some carboxylic acid or hydroxyl group containing compounds remain, which may be involved in depolymerization or decomposition of the polylactide resin.

More specifically, it is expected that the depolymerization or decomposition of polylactide resin predominantly occurs by hydrolysis of the carboxylic acid or water included in the lactide monomers and lactic acid, back-biting by the catalyst bonded to the end of polymer chain, or trans-esterification between the polymer chain wherein a catalyst is bonded to the end, and carboxylic acid, and the like.

However, the specific catalyst of the organic metal complex or the catalyst composition exhibits excellent polymerization activity thus enabling preparation of polylactide resin having very low residual metal content, namely, very low residual catalyst content. Moreover, since polylactide resin having a high molecular weight may be prepared within a short time due to the excellent polymerization activity of the specific catalyst, depolymerization which is an equilibrium reaction may hardly occur during the polymerization, and polylactide resin having very low residual lactide monomer content may be obtained.

Further, a carbodiimide moiety bonded with a substituent is included in the specific catalyst, which may combine with water or carboxylic acid, and the like to remove them.

Due to the actions of the catalyst, depolymerization or decomposition factors in the polylactide resin such as a residual catalyst, residual lactide monomers, water or carboxylic acid, and the like may be largely reduced, and the carbodiimide moiety in the residual catalyst may reduce the depolymerization or decomposition factors during use of the polylactide resin.

Thereby, according to the above explained preparation method, decomposition or depolymerization may be largely reduced during use of polylactide resin, and thus, polylactide resin satisfying low range of hydrolysis rate constant k of about 0.1 day$^{-1}$ or less according to one embodiment of the invention may be prepared.

Therefore, according to another embodiment of the invention, polylactide resin having a high molecular weight range while satisfying the specific hydrolysis rate constant range and the specific residual metal content range according to one embodiment of the invention may be prepared. As explained above, the polylactide resin may exhibit excellent mechanical properties due to the high molecular weight, and molecular weight decrease and mechanical property deterioration may be reduced during use, and thus, it can be used for a semi-permanent use.

And, according to the preparation method of another embodiment, polylactide resin having the above explained excellent properties may be prepared with high conversion rate due to the excellent polymerization activity of the specific catalyst, Meanwhile, according to the preparation method, the lactide monomers may be prepared from lactic acid. And, the lactide monomers may be any form of lactide, for example, L,L-lactide, D,L-lactide or D,D-lactide, and the like.

Further, in the preparation method, the compound of the Chemical Formula 1 or Chemical Formula 2 may have a specific carbodiimide structure substituted by a C3-10 alkyl, cycloalkyl, alkylene or cycloalkylene group, or a C6-10 aryl or arylene group. And, as will be supported by the following Examples and Comparative Examples, since the compound has the specific carbodiimide structure, it may exhibit excellent polymerization activity and effectively remove water or acid, and the like included in resin, and thus, polylactide resin satisfying the above explained high molecular weight, low residual metal content (residual catalyst content) and low hydrolysis rate constant ranges may be prepared. In this regard, as the compound of the Chemical Formula 1 or Chemical Formula 2, a compound wherein $R^1$ is a monovalent phenyl group substituted by a C1-10 alkyl group, a C3-10 alkyl, or cycloalkyl group, $R^2$ is a divalent phenylene group substituted by a C1-10 alkyl group, a C3-10 alkylene, or cycloalkylene group may be used.

And, the $MX_pY_{2-p}$ bonded to the Chemical Formula 1 or the compound of the Chemical Formula 3 may be a Sn or Zn containing compound or a mixture thereof, and representative examples thereof may comprise tin(II) 2-ethylhexanoate(Sn(Oct)$_2$).

And, as will be described in the following Example, the organic metal complex of the Chemical Formula 1 may be prepared by reacting the compounds of the Chemical Formulae 2 and 3.

Further, in the preparation method, the organic metal complex of the Chemical Formula 1 or the compounds of the Chemical Formulae 2 and 3 may be respectively added in the ratio of about 0.0005 to 0.1 moles, preferably about 0.0005 to 0.01 moles, more preferably about 0.0005 to 0.005 moles per 100 moles of lactide monomers. If the ratio of the added catalyst is too low, polymerization activity may be insufficient, and if it is too high, residual metal content (residual catalyst content) of the prepared polylactide resin may increase.

And, according to the preparation method of polylactide resin, the organic metal complex of the Chemical Formula 1 may be used as a single catalyst, or a catalyst composition comprising the compounds of the Chemical Formulae 2 and 3 may be used, and in terms of high molecular weight of the resin obtained by polymerization, polymerization activity or conversion rate into resin, and the like, it is preferable to use the organic metal complex of the Chemical Formula 1 as a single catalyst.

If the compounds of the Chemical Formulae 2 and 3 are used as a catalyst, these compounds may be simultaneously added, or sequentially added, and they may be added at a regular time interval before monomer introduction and polymerization initiation, or added immediately before polymerization initiation. However, in order to react the compounds of the Chemical Formulae 2 and 3 to some degree so as to form a complex thereof, it is preferable to simultaneously add the compounds of the Chemical Formulae 2 and 3 at a regular time interval before polymerization initiation, and then, introduce monomers to initiate polymerization.

And, in the preparation method of polylactide resin, the ring opening polymerization may be progressed in the presence of an initiator comprising a hydroxyl containing compound. The initiator may react with the catalyst to form substantial catalyst active species, thereby initiating the ring opening polymerization. And, the initiator may be involved in depolymerization or decomposition of resin to control the molecular weight.

As the initiator, a compound having a hydroxyl group may be used without specific limitation. However, if the compound has a carbon number less than 8, the molecular weight is too low and it may be vaporized at a ring opening polymerization temperature, and thus, it may be difficult to participate in polymerization. Therefore, as the initiator, a C8 or more hydroxyl containing compound may be preferably used.

And, the initiator may be added in the ratio of about 0.001 to 1 moles, preferably about 0.01 to 0.5 moles, more preferably about 0.05 to 0.3 moles per 100 moles of lactide monomers. If the ratio of the initiator is too low, molecular weight of polylactide resin may become too high to render subsequent processing difficult, and if it is too high, molecular weight of resin and polymerization activity may decrease.

Further, the ring opening polymerization of the lactide monomers is preferably progressed by bulk polymerization without substantially using a solvent. Wherein, the description "without substantially using a solvent" may include using a small amount of solvent for dissolving a catalyst, for example, maximum less than about 1 ml of a solvent per 1 kg of lactide monomers.

As the ring opening polymerization is progressed by bulk polymerization, a process for removing a solvent after polymerization may be omitted, and decomposition of resin during the solvent removal process may be prevented. And, the polylactide resin may be obtained with high conversion rate and yield by the bulk polymerization.

Further, the ring opening polymerization may be progressed at a temperature of from 120 to 200° C. for about 0.5 to 8 hours, preferably for about 0.5 to 4 hours. In the above explained preparation method, since a catalyst having excellent activity is used, polylactide resin having a high molecular weight may be obtained with high conversion rate and yield even if ring opening polymerization is progressed for a shorter time than previously known method, and depolymerization or decomposition of resin may be reduced due to polymerization within a short time.

According to the above preparation method, polylactide that exhibits low residual metal content (residual catalyst content) and low hydrolysis rate constant range, and thus may manifest and maintain excellent mechanical properties and exhibit excellent heat resistance according to one embodiment of the invention may be prepared with high conversion rate and yield.

Meanwhile, according to yet another embodiment of the invention, a polylactide resin composition comprising the above explained polylactide resin is provided.

Since the polylactide resin composition comprises polylactide resin which may manifest and maintain excellent mechanical properties and exhibit excellent heat resistance, it may exhibit excellent physical mechanical properties, and thus, may be preferably used for a semi-permanent used such as electronic product packaging or interior furnishing of automobiles, and the like.

The polylactide resin composition may comprise the polylactide resin alone or in combination with polycarbonate resin, ABS resin or polypropylene resin, and the like. However, in order to exhibit unique properties of the resin, the resin composition may comprise the polylactide resin in the content of about 40 wt % or more, preferably about 60 wt % or more, more preferably about 40 wt % or more, based on total content of the resin included therein.

And, the polylactide resin composition may further comprise various additives commonly included in various resin composition.

Further, the polylactide resin composition may be formed as a liquid or solid resin composition before forming a final product, or it may be formed as a final product of plastic or woven fabrics, which may be prepared by a common method according to each product form.

As explained, according to the present invention, polylactide resin that may manifest and maintain excellent mechanical properties and exhibit excellent heat resistance, and a preparation method thereof are provided.

Accordingly, the present invention may largely contribute to using polylactide resin, of which use has been limited to a disposable material, for various materials requiring semi-permanent use such as electronic product packaging or interior furnishing of automobiles, and the like, as well as a disposable product such as a food packaging film, a household item film and a sheet.

Hereinafter, the present invention will be explained in more detail by the following Examples. However, these Examples are only to illustrate the invention, and the scope of the invention is not limited thereto.

Experimental Method

In the following Examples and Comparative Examples, all the operations dealing with compounds sensitive to air or water are conducted using standard Schlenk technique or dry box technique.

Nuclear magnetic resonance spectrum was obtained using a Bruker 600 spectrometer, and $^1$H NMR was measured at 600 MHz.

Molecular weight and molecular weight distribution of polymer were measured by GPC (gel permeation chromatography), wherein a polystyrene sample was used as a standard.

A Sn(Oct)$_2$ (Oct=octoate) compound used for catalyst or preparation thereof was purchased from Aldrich Co., and a Sn(OBu)$_2$ (OBu=butoxy) compound was prepared according to existing document (Gsell and Zeldin J. inorg. nucl. Chem, 37, 1133 (1975)).

Synthesis Example 1

Sn(Oct)$_2$ (Aldrich Co.) (0.2 g, 0.49 mmol) and a compound of the following Chemical Formula 4 (TCI Co. Ltd.) (0.36 g, 1.0 mmol) were respectively introduced in a 100 mL flask, toluene 30 mL was put, and the mixture was agitated at 100° C. for 1 hours. And then, a solvent was removed under vacuum, washed and dried with a heptanes solvent to obtain 0.36 g of an organic metal complex A.

[Chemical Formula 4]

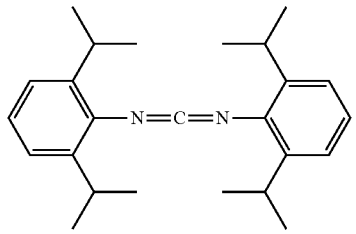

Synthesis Example 2

Sn(Oct)$_2$ (Aldrich Co.) (0.2 g, 0.49 mmol) and 0.36 g of a compound of the following Chemical Formula 5 (Rhein Chemie Co.) were respectively introduced in a 100 ml flask, and 0.4 g of an organic metal complex A was obtained by the same method as Synthesis Example 1.

FIG. 1 is $^{13}$C NMR spectrum of an organic metal complex B. Referring to FIG. 1, three carbonyl peaks appear at δ 188, 183, 182 ppm in the reaction of the Sn(Oct)$_2$ catalyst and the compound of the Chemical Formula 5, wherein the very sharp peak at δ 183 ppm appears to be an Oct-H acid compound bonded to the compound of the Chemical Formula 5, the broad peak at δ 188 ppm corresponds to free Sn(Oct)$_2$, and the broad peak at δ 182 ppm appears to be an organic metal complex coordinated with the compound of the Chemical Formula 5.

Figure 2:
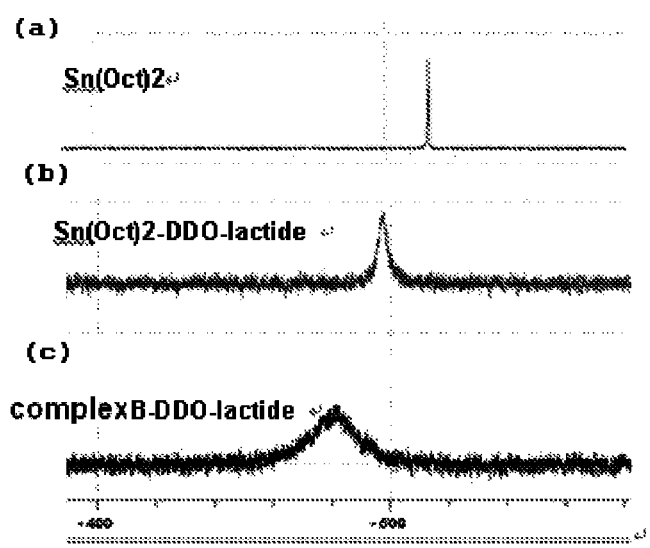
FIG. 2 respectively shows (a) $^{119}Sn$ NMR spectrum of $Sn(Oct)_2$ at 100° C., (b) $^{119}Sn$ NMR spectrum at 100° C. when reacting $Sn(Oct)_2$, dodecyl alcohol and lactide monomers, and, (c) $^{119}Sn$ NMR spectrum at 100° C. when reacting an organic metal complex B, dodecyl alcohol and lactide monomers.

FIG. 2 shows from the top to the bottom (a) $^{119}$Sn NMR spectrum of Sn(Oct)$_2$ at 100° C., (b) $^{119}$Sn NMR spectrum at 100° C. when reacting Sn(Oct)$_2$, dodecyl alcohol and lactide monomers, and, (c) $^{119}$Sn NMR spectrum at 100° C. when reacting an organic metal complex B, dodecyl alcohol and lactide monomers.

Referring to FIG. 2, Sn(Oct)$_2$ shows a very narrow peak at δ–516 (FIG. 2 (a)), and, if it reacts with dodecyl alcohol and lactide monomers, Sn peak broadens at δ–497 and down field shift appears (FIG. 2 (b)). To the contrary, if the organic metal complex B is reacted with dodecyl alcohol and lactide monomers, Sn peak more broadens at δ–491, and more significant down field shift appears compared to the Sn(Oct)$_2$ (FIG. 2 (c)). From the results, it is confirmed that the organic metal complex B has a catalyst structure different from the Sn(Oct)$_2$ which has been previously used for ring opening polymerization of polylactide resin, and it is also confirmed from the significant down field shift observed in FIG. 2 (c) that in the organic metal complex B, the compound of the Chemical Formula 5 having a carbodiimide structure is coordinated with Sn(Oct)$_2$ to more increase cationic property of the center metal Sn. Due to the increased cationic property, the organic metal complex B exhibits higher reactivity with the lactide monomers, and it is expected to exhibit more improved activity of a catalyst for ring opening polymerization.

[Chemical Formula 5]

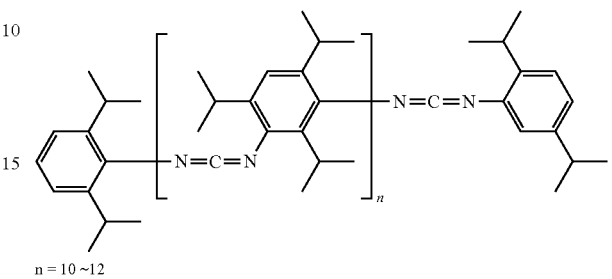

n = 10~12

Synthesis Example 3

Sn(Oct)$_2$ (Aldrich Co.) (0.2 g, 0.49 mmol) and a compound of the following Chemical Formula 6 (TCI Co. Ltd.) (0.12 g, 1.0 mmol) were respectively introduced in a 100 mL flask, toluene 30 mL was put, and the mixture was agitated at 100° C. for 1 hour. And then, a solvent was removed under vacuum, washed and dried with a heptanes solvent to obtain 2.5 g of an organic metal complex C.

[Chemical Formula 6]

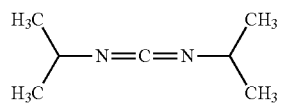

Synthesis Example 4

Sn(Oct)$_2$ (Aldrich Co.) (0.2 g, 0.49 mmol) and a compound of the following Chemical Formula 7 (TCI Co. Ltd.) (0.21 g, 1.0 mmol) were respectively introduced in a 100 mL flask, toluene 30 mL was put, and the mixture was agitated at 100° C. for 1 hour. And then, a solvent was removed under vacuum, washed and dried with a heptanes solvent to obtain 2.9 g of an organic metal complex D.

[Chemical Formula 7]

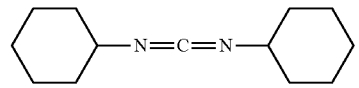

Example 1

Preparation of Polylactide Resin Using the Organic Metal Complex A (Sn/Lactide=1/40000 (mol/mol), 160° C.)

L-lactide monomers (2 g, 13.8 mmol), and the organic metal complex A of Synthesis Example 1 (0.2 mL, 3.5 mM concentration of toluene solution) were respectively introduced in a 30 mL vial, allowed to stand under vacuum for 12 hours, and then, reacted at a polymerization temperature of 160° C. for 2 hours. And then, hardened polymer was dissolved in 30 mL chloroform, and precipitated under a methanol solvent. The precipitate was filtered with a glass funnel to recover polymer, which is dried in a vacuum oven at 50° C. for 24 hours to obtain 1.62 g of polylactide resin (81 wt % based on total weight of introduced monomers). Molecular weight (Mw) was 491,000, and Mw/Mn was 2.0.

Example 2

Preparation of Polylactide Resin Using Organic Metal Complex A (Sn/Lactide=1/60000 (mol/mol), 180° C.)

L-lactide monomers (2 g, 13.8 mmol), and the organic metal complex A of Synthesis Example 1 (0.07 mL, 3.5 mM concentration of toluene solution) were respectively introduced in a 30 mL vial, allowed to stand under vacuum for 12 hours, and then, reacted at a polymerization temperature of 180° C. for 2 hours. 1.34 g (81 wt % based on total weight of introduced monomers) of polylactide resin was obtained by the same method as Example 1. The molecular weight (Mw) was 274,000, and Mw/Mn was 1.7.

Example 3

Preparation of Polylactide Resin Using Organic Metal Complex B (Sn/Lactide=1/40000 (mol/mol), 160° C.)

L-lactide monomers (2 g, 13.8 mmol), and the organic metal complex B of Synthesis Example 2 (0.2 mL, 3.5 mM concentration of toluene solution) were introduced in a 30 mL vial, allowed to stand under vacuum for 12 hours, and then, reacted at a polymerization temperature of 160° C. for 2 hours. 1.70 g (85 wt % based on total weight of introduced monomers) of polylactide resin was obtained by the same method as Example 1. The molecular weight (Mw) was 684,000, and Mw/Mn was 1.8.

Example 4

Preparation of Polylactide Resin Using Organic Metal Complex B (Sn/Lactide=1/60000 (mol/mol), 180° C.)

L-lactide monomers (2 g, 13.8 mmol), and the organic metal complex B of Synthesis Example 2 (0.07 mL, 3.5 mM concentration of toluene solution) were respectively introduced in a 30 mL vial, allowed to stand under vacuum for 12 hours, and then, reacted at a polymerization temperature of 180° C. for 2 hours. 1.61 g (81 wt % based on total weight of introduced monomers) of polylactide resin was obtained by the same method as Example 1. The molecular weight (Mw) was 276,000, and Mw/Mn was 1.9.

Example 5

Preparation of Polylactide Resin Using Organic Metal Complex B (Sn/Lactide=1/80000 (mol/mol), 180° C.)

L-lactide monomers (2 g, 13.8 mmol), and the organic metal complex B of Synthesis Example 2 (0.05 mL, 3.5 mM concentration of toluene solution) were respectively introduced in a 30 mL vial, allowed to stand under vacuum for 12 hours, and then, reacted at a polymerization temperature of 180° C. for 4 hours. 1.8 g (88 wt % based on total weight of introduced monomers) of polylactide resin was obtained by the same method as Example 1. The molecular weight (Mw) was 221,000, and Mw/Mn was 1.8.

Example 6

Preparation of Polylactide Resin Using Organic Metal Complex C (Sn/Lactide=1/40000 (mol/mol), 180° C.)

L-lactide monomers (2 g, 13.8 mmol), and the organic metal complex C of Synthesis Example 3 (0.1 mL, 3.5 mM concentration of toluene solution) were respectively introduced in a 30 mL vial, allowed to stand under vacuum for 12 hours, and then, reacted at a polymerization temperature of 180° C. for 2 hours. 1.67 g (83 wt % based on total weight of introduced monomers) of polylactide resin was obtained by the same method as Example 1. The molecular weight (Mw) was 214,000, and Mw/Mn was 1.7.

Example 7

Preparation of Polylactide Resin Using Organic Metal Complex D (Sn/Lactide=1/40000 (mol/mol), 180° C.)

L-lactide monomers (2 g, 13.8 mmol), and the organic metal complex D of Synthesis of Example 4 (0.1 mL, 3.5 mM concentration of toluene solution) were respectively introduced in a 30 mL vial, allowed to stand under vacuum for 12 hours, and then, reacted at a polymerization temperature of 180° C. for 2 hours. 1.78 g (89 wt % based on total weight of introduced monomers) of polylactide resin was obtained by the same method as Example 1. The molecular weight (Mw) was 257,000, and Mw/Mn was 1.9.

Example 8

Preparation of Polylactide Resin in the Presence of Compound of Chemical Formula 5 and $Sn(Oct)_2$ Catalyst (Sn/Lactide=1/80000 (mol/mol), 180° C.)

L-lactide monomers (2 g, 13.8 mmol), the compound of the Chemical Formula 5 (Rhein Chemie Co.) (0.1 wt % based on the weight of lactide), and $Sn(Oct)_2$, (0.05 mL, 3.5 mM concentration of toluene solution) were respectively introduced in a 30 mL vial, allowed to stand under vacuum for 12 hours, and then, reacted at a polymerization temperature of 180° C. for 4 hours. 1.56 g (78 wt % based on total weight of introduced monomers) of polylactide resin was obtained by the same method as Example 1. The molecular weight (Mw) was 231,000, and Mw/Mn was 1.84.

Example 9

Preparation of Polylactide Resin in the Presence of Compound of Chemical Formula 5 and $Sn(Oct)_2$ Catalyst (Sn/Lactide=1/40000 (mol/mol), 180° C.)

L-lactide monomers (3000 g), a compound of the Chemical Formula 5 (Rhein Chemie Co.) (0.1 wt % based on the weight of lactide), and $Sn(Oct)_2$ (0.21 g) were respectively introduced in a 5 L polymerization reactor, and reacted at a polymerization temperature of 180° C. for 2 hours. 2550 g (85 wt % based on total weight of introduced monomers) of polylactide resin was obtained by the same method as Example 1. The molecular weight (Mw) was 345,000, and Mw/Mn was 1.91.

Example 10

Preparation of Polylactide Resin in the Presence of Compound of Chemical Formula 5 and $Sn(OBu)_2$ Catalyst (Sn/Lactide=1/40000 (mol/mol), 180° C.)

L-lactide monomers (2 g, 13.8 mmol), a compound of the Chemical Formula 5 (Rhein Chemie Co.) (0.1 wt % based on the weight of lactide), and $Sn(OBu)_2$ (0.1 mL, 3.5 mM concentration of toluene solution) were respectively introduced in a 30 mL vial, allowed to stand under vacuum for 12 hours, and then, reacted at a polymerization temperature of 180° C. for 2 hours. 1.56 g (78 wt % based on total weight of introduced monomers) of polylactide resin was obtained by the same method as Example 1. The molecular weight (Mw) was 371,000, and Mw/Mn was 1.98.

Example 11

Preparation of Polylactide Resin Using Alcohol Initiator in the Presence of Compound of Chemical Formula 5 and Sn(Oct) Catalyst (Sn/Lactide=1/200000 (mol/mol), 180° C.)

L-lactide monomers (3000 g), a compound of the Chemical Formula 5 (Rhein Chemie Co.) (0.1 wt % based on the weight of lactide), $Sn(Oct)_2$ (0.04 g), and dodecyl alcohol (0.1 mol % based on the moles of lactide) were respectively introduced in a 5 L polymerization reactor, and reacted at a polymerization temperature of 180° C. for 4 hours. 2820 g (94 wt % based on total weight of introduced monomers) of polylactide resin was obtained by the same method as Example 1. The molecular weight (Mw) was 221,000, and Mw/Mn was 1.98.

Example 12

Preparation of Polylactide Using Alcohol Initiator in the Presence of Compound of Chemical Formula 5 and Sn(Oct) Catalyst (Sa/Lactide=1/150000 (mol/mol), 180° C.)

L-lactide monomers (3000 g), a compound of the Chemical Formula 5 (Rhein Chemie Co.) (0.1 wt % based on the weight of lactide), $Sn(Oct)_2$ (0.06 g), and dodecyl alcohol (0.1 mol % based on the moles of lactide) were respectively introduced in a 5 L polymerization reactor, and reacted at a polymerization temperature of 180° C. for 4 hours. 2820 g (94 wt % based on total weight of introduced monomers) of polylactide resin was obtained by the same method as Example 1. The molecular weight (Mw) was 225,000, and Mw/Mn was 2.05.

Example 13

Preparation of Polylactide Resin Using Alcohol Initiator in the Presence of Compound of Chemical Formula 5 and $Sn(Oct)_2$ Catalyst (Sn/Lactide=1/100000 (mol/mol), 180° C.)

L-lactide monomers (3000 g), a compound of the Chemical Formula 5 (Rhein Chemie Co.) (0.1 wt % based on the weight of lactide), $Sn(Oct)_2$ (0.08 g), and dodecyl alcohol (0.1 mol % based on the moles of lactide) were respectively introduced in a 5 L polymerization reactor, and reacted at a polymerization temperature of 180° C. for 4 hours. 2790 g (93 wt % based on total weight of introduced monomers) of polylactide resin was obtained by the same method as Example 1. The molecular weight (Mw) was 212,000, and Mw/Mn was 2.1.

Example 14

Preparation of Polylactide Resin Using Alcohol Initiator in the Presence of Compound of Chemical Formula 5 and $Sn(Oct)_2$ Catalyst (Sn/Lactide=1/60000 (mol/mol), 180° C.)

L-lactide monomers (3000 g), a compound of the Chemical Formula 5 (Rhein Chemie Co.) (0.1 wt % based on the weight of lactide), $Sn(Oct)_2$ (0.14 g), and dodecyl alcohol (0.1 mol % based on the moles of lactide) were respectively introduced in a 5 L polymerization reactor, and reacted at a polymerization temperature of 180° C. for 3 hours. 2850 g (95 wt % based on total weight of introduced monomers) of polylactide resin was obtained by the same method as Example 1. The molecular weight (Mw) was 223,000, and Mw/Mn was 2.1.

Referring to Examples 1 to 14, it is confirmed that if polylactide resin is prepared using the organic metal complex of the Chemical Formula 1 or a mixture of the compounds of the Chemical Formulas 2 and 3 as a catalyst, polylactide resin having high weight average molecular weight of minimum 200,000 or more may be obtained with high conversion rate within a comparatively short time.

And, referring to Examples 11 to 14, it is confirmed that if a hydroxy group containing initiator is added, polylactide resin may be obtained with higher conversion rate, and the molecular weight of the polylactide resin is decreased by the addition of the initiator, thus controlling molecular weight.

Comparative Example 1

Preparation of Polylactide Resin

L-lactide monomers (3000 g) and $Sn(Oct)_2$ (Aldrich Co.) (0.21 g) were respectively introduced in a 5 L polymerization reactor, and reacted at a polymerization temperature of 180° C. respectively for 2 hours and 6 hours (2 hours reaction—Comparative Example 1-2; 6 hours reaction—Comparative Example 1-6), by the same method as Example 1, except using $Sn(Oct)_2$ (Aldrich Co.) instead of the organic metal complex A as a catalyst. Subsequent processes were progressed by the same method as Example 1, to obtain 1015 g (35 wt % based on the total weight of introduced monomers) polylactide resin in Comparative Example 1-2, and 2670 g (89 wt % based on the total weight of introduced monomers) polylactide resin in Comparative Example 1-6. The molecular weight (Mw) and Mw/Mn were 165,000 and 1.69 in Comparative Examples 1-2, and 282,000 and 1.99 in Comparative Examples 1-6.

Referring to the Comparative Example 1, it is confirmed that if the existing $Sn(Oct)_2$ catalyst is used, conversion rate into polylactide resin is low, and the molecular weight of the polylactide resin is also relatively low. And, to obtain high molecular weight of the polylactide resin, a polymerization for a long time is required, and thus, it is expected that depolymerization which is an equilibrium reaction of the polymerization reaction significantly occurs to increase the amount of remaining lactide monomers.

Comparative Example 2

L-lactide monomers (2 g, 13.8 mmol) and Sn(Oct)2 (0.14 mg, Sn/lactide=1/40000 (mol/mol)) were respectively introduced in a 30 mL vial, and reacted at a polymerization temperature of 180° C. with changing polymerization time, by the same method as Example 1, except using an additive of bis(trimethylsilyl)carbodiimide, phosphate or phenol (0.1 wt % based on the weight of lactide monomers) and using $Sn(Oct)_2$ (Aldrich Co.) instead of the organic metal complex A as a catalyst. And, then, polymerization yield (conversion rate) and weight average molecular weight were measured. A carbodiimide compound containing a silicon atom, i.e., bis(trimethylsilyl)carbodiimide was used, TNPP, Irgafos 126 was used as a phosphate additive, and Irganox 1076 was used as a phenol additive. As the result of polymerization, the obtained conversion rate and weight average molecular weight are summarized in Table 1.

TABLE 1

| additives | Polymerization time (hr) | Conversion rate (%) | Mw (*10$^{-3}$ Da) | Mn (*10$^{-3}$ Da) | PDI |
|---|---|---|---|---|---|
| bis(trimethylsilyl) carbodiimide | 1 | 17.5 | 23.1 | 19.3 | 1.2 |
|  | 2 | 25.6 | 35.2 | 25.1 | 1.4 |
|  | 4 | 48.9 | 5.86 | 41.8 | 1.4 |
| TNPP | 1 | 23.6 | 51.7 | 38.8 | 1.3 |
|  | 2 | 24.5 | 33.7 | 27.0 | 1.2 |
|  | 4 | 45.7 | 86.7 | 57.9 | 1.5 |
| IRF 126 | 1 | 14.6 | 19.0 | 17.9 | 1.1 |
|  | 2 | 32.4 | 57.6 | 47.0 | 1.2 |
|  | 4 | 50.1 | 49.8 | 34.5 | 1.4 |
| IRN 1076 | 1 | 25.6 | 43.5 | 35.6 | 1.2 |
|  | 2 | 41.6 | 52.2 | 40.2 | 1.3 |
|  | 4 | 57.7 | 75.1 | 49.3 | 1.5 |

Referring to the Table 1, it is confirmed that if a specific carbodiimide compound substituted by an alkyl group, a cycloalkyl group or an aryl group (for example, a compound of the Chemical Formula 2 or an organic metal complex of the Chemical Formula 1 to which such a compound is bonded) is not used, and another carbodiimide compound is used, polymerization activity is low and thus conversion rate into polylactide resin is low, and polylactide resin having low weight average molecular weight is obtained. It is also confirmed that as disclosed in U.S. Pat. No. 5,338,882, and the like, even if additives of phosphate or phenols are used, polylactide resin having weight average molecular weight of about 90,000 or less is obtained, thus having limitation in obtaining polylactide resin having high molecular weight.

Experimental Example 1

Figure 3:
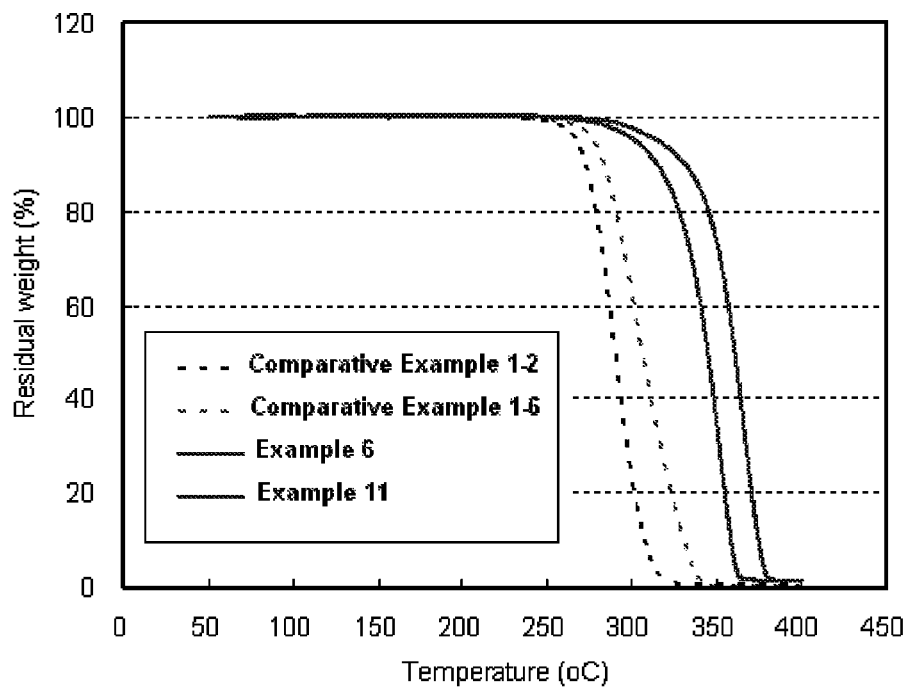
FIG. 3 is a graph showing the thermogravimetric analysis (TGA) results of the polylactide resin prepared in Examples 6 and 11 and Comparative Examples 1-2 and 1-6.

To test heat stability of the polylactide resin obtained by polymerization respectively for 2, 6 hours in Comparative Example 1 (Comparative Examples 1-2 and 1-6), and the polylactide resin obtained in Examples 6 and 11, TGA analysis was conducted. The results are shown in FIG. 3. And, the TGA analysis is conducted while raising a temperature from room temperature to 400° C. at a temperature raising speed of 10° C./min, and as the TGA analysis device, mettler-toledo TGA 851e was used.

Referring to FIG. 3, it is confirmed that the polylactide resins of Examples exhibit minimized decomposition, and the like, and thus exhibit weight loss of about less than 10 wt % even when the temperature is raised to approximately 300° C., while the polylactide resins of Comparative Examples 1-2 and 1-6 exhibit weight loss greater than minimum 30 wt % when the temperature is raised to approximately 300° C.

Therefore, it is confirmed that the polylactide resins of Examples exhibit excellent heat resistance compared to the polylactide resins of Comparative Examples, and may maintain high molecular weight and thus excellent mechanical properties.

Experimental Example 2

Measurement of Residual Metal Content (Residual Catalyst Content) in Polylactide Resin The content of residual metal derived from a catalyst (residual catalyst) in the polylactide resin was measured by inductively coupled plasma emission spectroscopy.

By this method, the content of residual metal of Sn derived from a catalyst in the polylactide resins prepared in Examples 11 to 14 were measured and described in the following Table 2. And, for comparison, the polylactide resin samples of product names: 4032D and 6201D purchased from NatureWorks were designated as Comparative Examples 3 and 4, and residual metal contents of Comparative Examples 1-6, 3 and 4 were measured and described in Table 2.

Measurement of Hydrolysis Rate Constant (k) and Mechanical Properties of Polylactide Resin For the polylactide resins of Examples 11 to 14 and the polylactide resins of Comparative Examples 1-6, 3 and 4, hydrolysis rate constant (k) and mechanical properties (tensile strength) were measured as follows. For each polylactide resin, a specimen of which tensile strength may be measured was prepared with a HAAKE Minijet II Injection molder. During preparation of specimens at 200° C., molecular weight decrease was observed to some degree. However, it is confirmed that this does not have a bad influence on property comparison.

Each specimen was maintained under constant temperature and humidity of a temperature of 60° C. and relative humidity of 90%, and changes in tensile strength, number average molecular weight, and weight average molecular weight were measured over time. Measurement results of the properties over time are summarized in the following Table 2.

Figure 4:
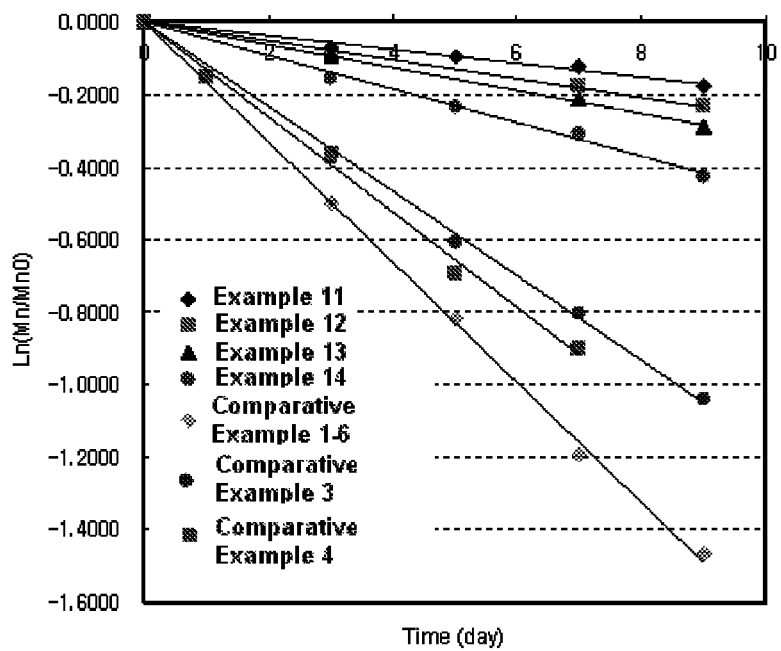
FIG. 4 is a graph showing the linear regression of change aspect of "$Log_e$ [Mn,t/Mn,0]" value according to maintenance time (t) of polylactide resin of Examples 11 to 14, and Comparative Examples 1-6, 3 and 4 under high temperature, high humidity, in Experimental Example 2.

From the measured number average molecular weight, the "$Log_e$ [Mn,t/Mn,0]" in the Mathematical formula 1 was calculated, and linear regression of the "$Log_e$ [Mn,t/Mn,0]" over time was shown in FIG. 4. And, from the measured tensile strength, the ratio of "tensile strength after assigned time (TS(t))/initial tensile strength (TS(O))" was calculated, and the ratio over time was shown in FIG. 5.

TABLE 2

| Specimen sample | Residual metal content (ppm) | time (day) | Mw(*10$^{-3}$ g/mol) | Mn(*10$^{-3}$ g/mol) | Mw/Mn | $Log_e$ [Mn, t/Mn, 0] | k (day$^{-1}$) | Tensile strength (kg/cm$^2$) |
|---|---|---|---|---|---|---|---|---|
| Example 11 | 4 | 0 | 165 | 86 | 1.9 | 0 | 0.0193 | 688 |
|  |  | 3 | 154 | 80 | 1.9 | −0.0723 |  | 684 |

TABLE 2-continued

| Specimen sample | Residual metal content (ppm) | time (day) | Mw(*10$^{-3}$) g/mol) | Mn(*10$^{-3}$) g/mol) | Mw/Mn | Log$_e$ [Mn, t/Mn, 0] | k (day$^{-1}$) | Tensile strength (kg/cm$^2$) |
|---|---|---|---|---|---|---|---|---|
| | | 5 | 140 | 78 | 1.8 | −0.0976 | | 665 |
| | | 7 | 139 | 76 | 1.8 | −0.1236 | | 655 |
| | | 9 | 141 | 72 | 2.0 | −0.1777 | | 589 |
| Example 12 | 6 | 0 | 164 | 87 | 1.9 | 0 | 0.0259 | 690 |
| | | 3 | 153 | 79 | 1.9 | −0.0965? | | 695 |
| | | 7 | 147 | 73 | 2.0 | −0.1754 | | 702 |
| | | 9 | 135 | 69 | 2.0 | −0.2318 | | 696 |
| Example 13 | 8 | 0 | 158 | 84 | 1.9 | 0 | 0.0314 | 684 |
| | | 3 | 148 | 76 | 1.9 | −0.0927 | | 689 |
| | | 7 | 137 | 68 | 2.0 | −0.2095 | | 688 |
| | | 9 | 122 | 63 | 2.0 | −0.2909 | | 683 |
| Example 14 | 13 | 0 | 169 | 88 | 1.9 | 0 | 0.0465 | 678 |
| | | 3 | 145 | 75 | 1.9 | −0.1568 | | 680 |
| | | 5 | 126 | 70 | 1.8 | −0.2340 | | 663 |
| | | 7 | 119 | 65 | 1.8 | −0.3083 | | 655 |
| | | 9 | 113 | 58 | 2.0 | −0.4261 | | 628 |
| Comparative Example 1-6 | 21 | 0 | 167 | 75 | 2.2 | 0 | 0.1651 | 668 |
| | | 3 | 93 | 45 | 2.1 | −0.4988 | | 589 |
| | | 5 | 61 | 33 | 1.9 | −0.8187 | | 310 |
| | | 7 | 40 | 23 | 1.8 | −1.1942 | | 156 |
| | | 9 | 30 | 17 | 1.8 | −1.4672 | | 78 |
| Comparative Example 3 | 17 | 0 | 146 | 80 | 1.8 | 0 | 0.1142 | 695 |
| | | 3 | 99 | 55 | 1.8 | −0.3790 | | 587 |
| | | 5 | 79 | 44 | 1.8 | −0.6095 | | 462 |
| | | 7 | 66 | 36 | 1.9 | −0.8066 | | 384 |
| | | 9 | 53 | 28 | 1.9 | −1.0381 | | 213 |
| Comparative Example 4 | 19 | 0 | 119 | 60 | 2.0 | 0 | 0.1307 | 673 |
| | | 3 | 94 | 51 | 1.8 | −0.1500 | | 658 |
| | | 5 | 76 | 42 | 1.8 | −0.3620 | | 356 |
| | | 7 | 54 | 30 | 1.8 | −0.6931 | | 230 |
| | | 9 | 44 | 24 | 1.8 | −0.9054 | | 106 |

Referring to Table 2, it is confirmed that the polylactide resins of Examples 11 to 14 prepared using the organic metal complex of the Chemical Formula 1 or the catalyst composition comprising the Chemical Formulas 2 and 3 may have high weight average molecular weight of 150,000 or more even in the specimen state finishing injection molding, maintain very low residual metal content derived from the catalyst of 20 ppm or less, and may exhibit low hydrolysis rate constant k of 0.1 day$^{-1}$ or less, specifically 0.05 day$^{-1}$ or less. Wherein, maintaining low residual metal content means that residual catalyst content in the polylactide resin is very low.

To the contrary, it is confirmed that the polylactide resins of Comparative Example 1-6 or the commercially available polylactide resins of Comparative Examples 3 and 4 may not satisfy theses properties, and have residual metal content exceeding 20 ppm, or hydrolysis rate constant k exceeding 0.1 day$^{-1}$.

Figure 5:
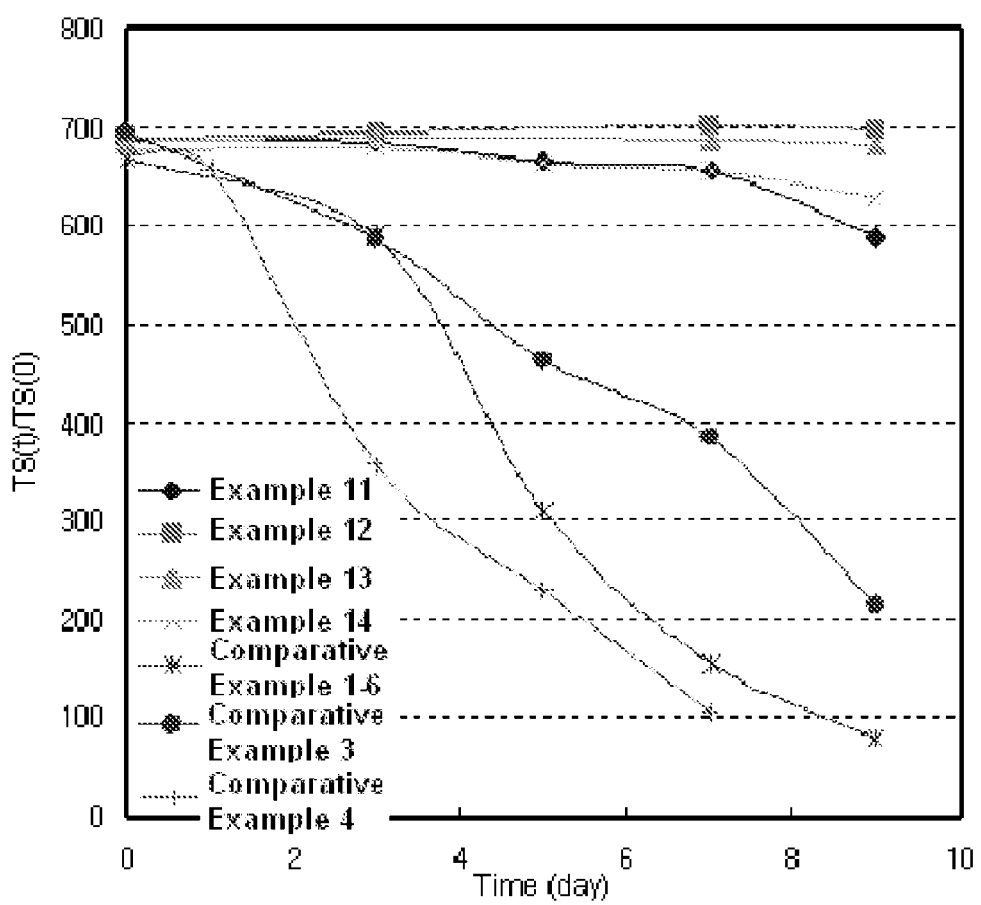
FIG. 5 is a graph showing the change aspect of "tensile strength after assigned time (TS(t))/initial tensile strength (TS(O))" value according to maintenance time (t) of polylactide resin of Examples 11 to 14, and Comparative Examples 1-6, 3 and 4 under high temperature, high humidity, in Experimental Example 2.

Further, referring to Table 2, FIGS. 4 and 5, it is confirmed that mechanical property deteriorations of the polylactide resin of Examples exhibiting residual metal content of 20 ppm or less (namely, low residual catalyst content) and hydrolysis rate constant k of 0.1 day$^{-1}$ or less are scarcely observed even if the polylactide resin is maintained under sever conditions of high temperature, high pressure, and thus, it may be applied for a semi-permanent use.

However, it is confirmed that the polylactide resin of Comparative Example 1-6 which does not satisfy the residual metal content and the hydrolysis rate constant ranges (namely, polylactide resin having high residual catalyst content and hydrolysis rate constant) or commercially available polylactide resin of Comparative Examples 3 and 4 exhibit significant deterioration of tensile strength over time, specifically deterioration of tensile strength to a degree less than 1/3, and thus, they cannot maintain excellent mechanical properties even if initially formed with high molecular weight, and cannot be applied for a semi-permanent use.

Experimental Example 3

For the polylactide resins obtained in Comparative Example 1-6, the commercially available polylactide resins of Comparative Example 3, and the polylactide resins obtained in Examples 11 to 14, acidities were measured. Acidity was measured using a Metrohm 809 Titando equipment, and 0.1 N KOH ethanol solution was used as a titration solution, and the results are described in Table 3.

TABLE 3

| | Acidity (meq/Kg) |
|---|---|
| Example 11 | 4 |
| Example 12 | 5 |
| Example 13 | 6 |
| Example 14 | 5 |
| Comparative Example 1-6 | 53 |
| Comparative Example 3 | 29 |

Referring to Table 3, it is confirmed that the polylactide resins of Examples exhibit low acidities of 10 meq/kg or less, while those of Comparative Examples exhibit high acidities of 29 meq/kg or more. Thus, it is confirmed that the polylactide resin obtained in Examples may exhibit high molecular weight and low acidity. Further, it is expected that since the polylactide resin of Examples has low acidity, trans-esterification or hydrolysis between the resin wherein catalyst is bonded to the end of the resin, and water or acid may be inhibited, and thus, decomposition or molecular weight decrease of the polylactide resin may be largely reduced after polymerization or during use.

Accordingly, it is expected that the polylactide resin of Examples may manifest and maintain excellent mechanical properties due to high molecular weight, and exhibit excellent hydrolysis resistance, and thus, can be applied for a semi-permanent use.

What is claimed is:

1. Polylactide resin having a weight average molecular weight of 100,000~1,000,000,
having a hydrolysis rate constant (k) of 0.1 day$^{-1}$ or less, as calculated by the following Mathematical Formula 1, at a temperature of 60° C. and relative humidity of 90%, and
containing residual metal of tin or zinc derived from a catalyst in the content of 20 ppm or less, based on the weight of the polylactide resin:

$$Log_e [Mn,t/Mn,0] = -kt$$ [Mathematical Formula 1]

in the Mathematical Formula 1, Mn,0 represents an initial number average molecular weight of the polylactide resin, and Mn,t represents a number average molecular weight of the polylactide resin when maintained at a temperature of 60° C. and relative humidity of 90%, for a time t (day).

2. The polylactide resin according to claim 1, wherein the residual metal of tin or zinc is included as a residual catalyst comprising an organic metal complex of the following Chemical Formula 1 or a mixture of compounds of the Chemical Formulas 2 and 3:

[Chemical Formula 1]
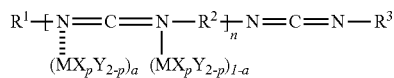

[Chemical Formula 2]
R$^1$—$\{$N=C=N—R$^2\}_n$N=C=N—R$^3$

[Chemical Formula 3]
MX$_p$Y$_{2-p}$ wherein, n is an integer of from 0 to 15, p is an integer of from 0 to 2, a is 0 or 1, M is Sn or Zn, R$^1$ and R$^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, R$^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

3. The polylactide resin according to claim 1, wherein the polylactide resin comprises residual lactide monomers in the content of 1.0 wt % or less, based on the total weight of the polylactide resin and the residual lactide monomers.

4. The polylactide resin according to claim 1, wherein the polylactide resin has an acidity of 20 meq/kg or less.

5. A method of preparing the polylactide resin according to claim 1, comprising conducting ring opening polymerization of lactide monomers in the presence of an organic metal complex of the following Chemical Formula 1,
wherein the organic metal complex is added in the ratio of 0.0005 to 0.1 moles, based on 100 moles of the lactide monomers:

[Chemical Formula 1]
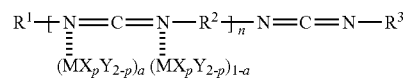

in the Chemical Formula 1, n is an integer of from 0 to 15, p is an integer of from 0 to 2, a is 0 or 1, M is Sn or Zn, R$^1$ and R$^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, R$^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

6. The method according to claim 5, wherein the MX$_p$Y$_{2-p}$ is tin(II) 2-ethylhexanoate(Sn(Oct)$_2$).

7. The method according to claim 5, wherein R$^1$ represents a monovalent phenyl group substituted with a C1-10 alkyl group, a C3-10 alkyl group, or cycloalkyl group, and R$^2$ represents a divalent phenylene group substituted with a C1-10 alkyl group, a C3-10 alkylene group, or cycloalkylene group.

8. The method according to claim 5, wherein the ring opening polymerization is progressed as bulk polymerization.

9. The method according to claim 5, wherein the ring opening polymerization is progressed at a temperature of from 120 to 200° C. for 0.5 to 8 hours.

10. A method for preparing the polylactide resin according to claim 1, comprising conducting ring opening polymerization of lactide monomers in the presence of compounds of the following Chemical Formulas 2 and 3,
wherein the compounds of the Chemical Formulas 2 and are respectively added in the ratio of 0.0005 to 0.1 moles, based on 100 moles of the lactide monomers:

[Chemical Formula 2]
R$^1$—$\{$N=C=N—R$^2\}_n$N=C=N—R$^3$

[Chemical Formula 3]
MX$_p$Y$_{2-p}$ in the Chemical Formulae 2 and 3, n is an integer of from 0 to 15, p is an integer of from 0 to 2, a is 0 or 1, M is Sn or Zn, R$^1$ and R$^3$ may be the same or different, and are independently hydrogen, a substituted or unsubstituted C3-10 alkyl group, a substituted or unsubstituted C3-10 cycloalkyl group, or a substituted or unsubstituted C6-10 aryl group, R$^2$ is a substituted or unsubstituted C3-10 alkylene group, a substituted or unsubstituted C3-10 cycloalkylene group, or a substituted or unsubstituted C6-10 arylene group, and X and Y are independently an alkoxy group or a carboxyl group.

11. The method according to claim 10, wherein the MX$_p$Y$_{2-p}$ is tin(II) 2-ethylhexanoate(Sn(Oct)$_2$).

12. The method according to claim 10, wherein R$^1$ represents a monovalent phenyl group substituted with a C1-10 alkyl group, a C3-10 alkyl group, or cycloalkyl group, and R$^2$ represents a divalent phenylene group substituted with a C1-10 alkyl group, a C3-10 alkylene group, or cycloalkylene group.

13. The method according to claim 10, wherein the ring opening polymerization is progressed as bulk polymerization.

14. The method according to claim 10, wherein the ring opening polymerization is progressed at a temperature of from 120 to 200° C. for 0.5 to 8 hours.

15. A polylactide resin composition comprising the polylactide resin of claim 1.

* * * * *